(12) United States Patent
Williams, Jr. et al.

(10) Patent No.: US 8,383,699 B2
(45) Date of Patent: Feb. 26, 2013

(54) PRINTING INKS FOR NONWOVEN SUBSTRATES

(75) Inventors: Charles Bryson Williams, Jr., Fort Mill, SC (US); Diane Steiner, Charlotte, NC (US); Tom DeBartolo, Waxhaw, NC (US)

(73) Assignee: Sun Chemical Corp., Parsippany, NJ (US)

( * ) Notice: Subject to any disclaimer, the term of this patent is extended or adjusted under 35 U.S.C. 154(b) by 45 days.

(21) Appl. No.: 12/089,355

(22) PCT Filed: Nov. 2, 2006

(86) PCT No.: PCT/US2006/060475
§ 371 (c)(1),
(2), (4) Date: Apr. 4, 2008

(87) PCT Pub. No.: WO2007/056660
PCT Pub. Date: May 18, 2007

(65) Prior Publication Data
US 2008/0255275 A1    Oct. 16, 2008

(51) Int. Cl.
*C09D 11/00*    (2006.01)

(52) U.S. Cl. .......... 523/160; 523/161; 524/35; 524/589; 524/81; 524/401

(58) Field of Classification Search ............... 524/35
See application file for complete search history.

(56) References Cited

U.S. PATENT DOCUMENTS

| | | | |
|---|---|---|---|
| 3,642,507 A * | 2/1972 | Olhoft et al. | 106/169.13 |
| 3,692,720 A | 9/1972 | Sloan | |
| 5,458,590 A | 10/1995 | Schleinz et al. | |
| 5,695,855 A | 12/1997 | Yeo et al. | |
| 5,853,859 A | 12/1998 | Levy et al. | |
| 6,642,343 B2 | 11/2003 | Gilles et al. | |
| 6,723,820 B1 * | 4/2004 | Arcurio et al. | 528/61 |

FOREIGN PATENT DOCUMENTS

| | | |
|---|---|---|
| EP | 1 229 090 A1 | 8/2002 |
| JP | 56-10551 | 2/1981 |
| JP | 3-115373 | 5/1991 |
| WO | WO-93/22360 A | 11/1993 |
| WO | WO-02/38643 A2 | 5/2002 |
| WO | WO-02/051644 | 7/2002 |

* cited by examiner

*Primary Examiner* — Doris Lee
(74) *Attorney, Agent, or Firm* — McKenna Long & Aldridge LLP

(57) ABSTRACT

A flexographic and/or rotogravure printing ink used on nonwoven substrates contains polyurethane resin, solvent, and colorant.

30 Claims, No Drawings

PRINTING INKS FOR NONWOVEN SUBSTRATES

FIELD OF THE INVENTION

The invention relates to flexographic and/or rotogravure printing inks for non-woven substrates.

BACKGROUND OF INVENTION

There are many different incontinence disposable child and adult care products on the market including diapers, training under pants, and temporary swimsuits. Many of these products are constructed with nonwoven substrates including but not limited to nonwoven polyethylene or nonwoven polypropylene films. There is a desire within the marketplace to print graphics on these nonwoven substrates for appearance such as mere decoration or for utility such as indication of wetness. These substrates are typically printed with flexographic or rotogravure presses for these products, however, the printed inks have low color transfer resistance so as to discolor anything the nonwoven substrate may come into contact with such as clothing, carpet and furniture. The nonwoven substrate is not porous such as paper and thus the printed ink easily transfers from the substrate onto contact substrates/objects. Thus, there is a desire for the printed graphics on nonwoven substrates to have augmented color transfer resistance properties.

U.S. Pat. No. 5,458,690 describes printing block urethane inks on nonwoven substrates for improved colorfastness and color transfer resistance. The block urethane ink system specifically mentioned is Parabond from Sun Chemical which is composed of a block urethane resin, vinyl resin, wax and epoxidized soybean oil along with pigments. U.S. Pat. No. 5,695,855 discloses adhesive inks for improved nonwoven products. U.S. Pat. No. 5,853,859 describes combining a latex polymer with pigment and a cure promoter for colorfastness when exposed to a wide range of pH liquids. International Publication Number WO 021051644 A1 discloses a two part cross linked ink with a two part cross linked coating.

However, none of the existing inks provide for use of conventional flexographic or rotogravure printing inks on nonwoven substrates having the same properties of enhanced color transfer resistance as on other substrates. Accordingly, a need exists for an ink which can be used in both flexographic or rotogravure printing on nonwoven substrates while exhibiting and maintaining enhanced color transfer resistance properties.

SUMMARY OF INVENTION

It has now been found that the above objectives can be realized by a flexographic and/or rotogravure printing ink used on non-woven substrates comprised of solvent, colorant, polyurethane resin which provides a rub rating of at least 6, and optionally but preferably, nitrocellulose resin. A preferred polyurethane resin has a composition derived from a mixture of aliphatic and aromatic diisocyanates.

Other objects and advantages of the present invention will become apparent from the following description and appended claims.

DETAILED DESCRIPTION OF THE INVENTION

The present invention provides a flexographic and/or rotogravure printing ink for use on non-woven substrates comprised of polyurethane resin, solvent, colorant, and optionally but preferably, nitrocellulose resin.

Any polyurethane resin which provides a rub rating of at least 6 for the formulation can be employed. Preferably, the rub rating is at least 7 and most preferably at least 8. The rub rating is determined by printing the ink composition on a polyethylene/polypropylene nonwoven substrate, mounting the printed nonwoven substrate on a Sutherland Rub tester (manufactured by KVP Sutherland Paper Co. of Kalamazoo, Mich.) and rubbing it against a white linen swatch. Ten individuals rank how much color was transferred from the printed nonwoven substrate to the linen on a scale from 1-10, with ten being the highest (no color transfer) and one being the lowest (essentially complete transfer). The rub rating is the average of the ten ratings.

One preferred class of polyurethane resin is those having a number average molecular weight of at least 10,000, preferably at least about 20,000, more preferably at least about 23,000, and most preferably at least about 30,000.

Another preferred class of polyurethane resin is the reaction product of a mixture of at least one aliphatic isocyanate (preferably a diisocyanate) and at least one aromatic isocyanate (preferably a diisocyanate) with at least one isocyanate-reactive compound which may be, for instance, a diol, diamine or the like. For convenience, this resin may be referred to as a semi-aliphatic polyurethane resin in this disclosure. Of the total molar quantity of isocyanate, the amount of aliphatic isocyanate component(s) is about 10% to about 90%, and preferably about 20% to about 80%. Accordingly, the amount of aromatic isocyanate component(s) is about 90% to about 10% of the total molar amount of isocyanate, and preferably about 20% to about 80%.

The aliphatic isocyanate or diisocyanate includes both straight-chain aliphatic and branched chain aliphatic compounds as well as cycloaliphatic compounds. Preferably, the isocyanate is a diisocyanate of 1 to about 10 carbon atoms. Examples of preferred diisocyanates are 1,4-diisocyanatobutane, 1,6-diisocyanatohexane, 1,5-diisocyanato-2,2-dimethylpentane, 4-trimethyl-1,6-diisocyanatohexane, 1,10-diisocyanatodecane, 1,3- and 1,4-diisocyanatocyclo-hexane, 1-isocyanato-5-isocyanatomethyl-3,5-trimethylcyclohexane (isophorone diisocyanate or IPDI), 2,3- 2,4- and 2,6-diisocyanato-1-methylcyclohexane, 4,4'- and 2,4'-diisocyanatodicyclohexylmethane, 1-isocyanato-3-(4)-isocyanatomethyl-1-methyl-cyclohexane, 4,4'- and 2,4'-diisocyanatodiphenylmethane, and mixtures thereof, or 2,2, 4- or 2,4,4 trimethyidiisocyanatohexane (TMDI).

The aromatic isocyanate or diisocyanate is an isocyanate which contains an aromatic or cycloaromatic moiety, and may also contain aliphatic moieties. Preferably, the isocyanate is a diisocyanate of 1 to about 10 carbon atoms. Examples of preferred diisocyanates are 1,1'-methylenebis[4-isocyanato-benzene (MDI), and 1,6-diisocyanato-hexane (HDI), toluene diisocyanate, and the like.

For some applications, TDI (1,3-diisocyanatomethyl-benzene) cannot be used for some applications due to regulatory restrictions. For such applications, TDI is not comprised by the group of aromatic diisocyanates that are present in a molar amount between about 10% and about 90%, but TDI may be present in an incidental amount of below about 10% if permitted by the applicable regulations.

The diol(s) which can be used to prepare the polyurethane resin of present invention are generally defined by the formula $R(OH)_2$ wherein R is a 2 to about 10 straight chain or branched chain hydrocarbon group. Preferably, R is an alkylene group of 2 to about 4 carbon atoms. Examples of preferred diols include polyethylene glycol (PEG), polypropylene glycol (PPG) and polytetramethylene glycols (PolyTHF), 1,4-butanediol, 1,6-hexanediol, neopentyl glycol, and mixtures thereof. According to the present invention, the use of PPG is particularly preferred.

Diamines are a further isocyanate-reactive component which can be used to prepare the resin. The diamine can be any aliphatic, cycloaliphatic, aromatic, or heterocyclic diamine having primary or secondary amino groups. Example are ethylenediamine, 1,2-diaminopropane, 1,3-diaminopropane, diaminobutane, hexamethylenediamine, 1,4-diaminocyclohexane, 3-aminomethyl-3,5,5-trimethylcyclohexylamine(isophorone diamine), m-xylene diamine or 1,3-bis(aminomethyl)cyclohexane.

Yet another preferred class of polyurethane resin is semi-aliphatic resins having a molecular weight of at least 20,000, and more preferably at least about 23,000, and most preferably at east about 30,000.

The polyurethane resin may be present in an amount of between about 10 wt. % to about 60 wt. %. It is preferred that the polyurethane resin be present in an amount of between about 30 wt. % to about 40 wt. %.

Suitable solvents in the ink of the present invention include highly active solvents and various combinations thereof. Such solvents include ketones, aromatic hydrocarbons, aliphatic hydrocarbons, esters, alcohols, and the like, depending on the type of printing ink being prepared, i.e., either flexographic or gravure. It is preferred that the solvent be a combination of ester(s) and alcohol(s) in a ratio of about 1:99 to 99:1, preferably about 10:90 to 20:80. The total amount of solvent is generally about 1 to 70%, preferably about 10 to 50%, and most preferably about 20 to 40%.

Suitable ester solvents include, but are not limited to, propyl acetate, ethyl acetate, butyl acetate, isopropyl acetate, propylene glycol monomethyl ether acetate and the like and combinations thereof. It is preferred that the ester solvent is propyl acetate. The ester solvent may be present in an amount of between about 1 wt. % to about 70 wt. %. It is preferred that the ester solvent be present in an amount of between about 10 wt. % to about 40 wt. % and most preferred between about 10 wt. % to about 20 wt. %

Alcohol solvents include, but are not limited to, ethanol, propynol, ispropynol, glycol ethers, 1-ethoxy-2-propanol, propylene glycol n-propyl ether, dipropylene glycol, n-butyl ether, dipropylene glycol ethyl ether, diacetone alcohol, methyl amyl alcohol, diethylene glycol monobutyl ether, propylene glycol methyl ether and the like, and combinations thereof. It is preferred that the alcohol solvent is propanol or ethanol, and most preferred ethanol. The alcohol solvent may be present in an amount of between about 10 wt. % to about 70 wt. %. It is preferred that the alcohol solvent be present in an amount of between about 20 wt. % to about 60 wt. % and more preferred between about 40 wt. % to about 50 wt. %

Suitable colorants include, but are not limited to, organic or inorganic pigments. Organic pigments may be one pigment or a combination of the following nonlimiting pigments: Pigment Yellows #12, 13, 14, 17, 74, 83; Pigment Reds #2, 22, 23, 48:1, 48:2, 52, 53, 57:1, 122, 166, 170, 266; Pigment Orange #5, 16, 34, 36; Blue #15:3, 15:4; Violet #3, 27; and/or Pigment Green #7. Inorganic pigments may be one of the following pigments: iron oxides, Pigment White #6, 7 and/or Pigment Black #7. These examples are illustrative only and other organic and inorganic pigments can be used as appropriate for the colors desired. The pigment may be present in an amount of between about 0.1 wt. % to about 20 wt. %. It is preferred that the pigment be present in an amount of between about 0.1 wt. % to about 10 wt. %.

The printing ink also preferably includes nitrocellulose resin. Suitable nitrocellulose resins are those which are solulizable in the composition and include, but are not limited to, a wide range of viscosity grades and solubility grades. For example, the solubility grade may be one of the well-known grades such as AS (all soluble), RS (ester soluble) and SS (spirit soluble) and combinations thereof. It is preferred that the nitrocellulose resin is solubility grade SS. The viscosity range may be between about $\frac{1}{16}$ second and 5 seconds as measured by steel ball drop test. It is preferred that the nitrocellulose have a viscosity between about $\frac{1}{8}$ to $\frac{1}{4}$ second. It is more preferred that the nitrocellulose resin is solubility grade SS with viscosity of about $\frac{1}{8}$ second. When present, the nitrocellulose resin may be in an amount up to about 15 wt. %, preferably between about 1 wt. % to about 10 wt. %, and most preferably in an amount of between about 1.0 wt. % to about 4.0 wt. %

The printing ink may also include waxes such as, but not limited to, amide wax, erucamide wax, polypropylene wax, paraffin wax, polyethylene wax, Teflon, carnuba wax and the like. The wax may be a combination of waxes. It is preferred that the wax be a blend of amide and erucamide waxes. The wax, if present, is in an amount of up to about 4 wt. %. When present, it is preferred that the wax be an amount of between about 0.1 wt. % to about 2 wt. %.

As with many printing inks, other additives, alone or in combination may be employed, including but not limited to other resins, titanates, ammonia, defoamers, stabilizers, silicones, plasticizers and the like.

The components of the printing ink may be mixed in any order of components. Typically, a pigment dispersion is combined with an ink vehicle containing resins and solvents. Another example is providing a pigment dispersion created by combining the pigment with nitrocellulose resin, ester solvent and alcohol solvent and then combining this dispersion with a polyurethane resin.

The printing ink imparts excellent color transfer resistance when printed on nonwoven substrates. The nonwoven substrate may be comprised of a polyethylene film, a polypropylene films, polyester films, nylon and the like, as well as combinations thereof. It is preferred that the nonwovens substrate be polyethylene or polypropylene. The non-woven may also be comprised of polymers, copolymers, natural fibers, as well as air laid, we laid, solution spun fiber webs, and the like.

The printing ink may be printed onto the nonwoven substrate via either flexographic or rotogravure (direct or indirect) printing process. The printed ink may be found on a variety of products including but not limited to personal care products, such as diapers, training pants, wipes, feminine pads, adult incontinence garments, hospital/medical gowns and related products, and clothing such as workwear and cleaning garments, and the like.

The printing inks of the present invention are further illustrated by the following non-limiting examples in which all parts and percentages are by weight, and temperatures in degrees Centigrade, unless otherwise indicated.

Example 1

A printing ink was prepared using SS 20 IPA Wet as the nitrocellulose resin, the semi-aliphatic reaction product of TDI, MDI and PPG having a molecular weight of 81,479 as polyurethane resin A, and Irgalite Blue GLVO as the pigment, according to the following formula:

TABLE 1

| Component | Weight percent |
| --- | --- |
| Nitrocellulose resin | 1.0 |
| Polyurethane resin A | 35.0 |
| Propyl acetate | 12.0 |
| Ethanol | 47.0 |
| Pigment | 5.0 |
| TOTAL | 100.0 |

Example 2

Various inks were prepared and tested for rub resistance, which represents the resistance to color transfer from the nonwoven substrate. In this test, each ink was printed on a composite polyethylene/proproypylene nonwoven substrate and visually observed for color transference by printing each ink on a composite polyethylene/polypropylene nonwoven substrate. The printed nonwoven substrate was mounted on a Sutherland Rub tester (manufactured by KVP Sutherland Paper Co. of Kalamazoo, Mich.) rubbed against a white linen swatch and evaluated by ten individuals for how much color was transferred from the printed nonwoven substrate to the linen. The inks were then ranked from 1-10, with ten being the highest or best ranking, for color transfer resistance which is exhibited by the least amount of color transferred onto the white linen swatch, and an average value calculated. A rank of 6 or greater was deemed acceptable. Preferably, the rank is at least 7 and most preferably at least 8.

The composition and results are set forth in Table 2 below. SS 20 IPA Wet was used as the nitrocellulose in all inks except 2-D which employed a combination of 2.4 parts of SS 20 IPA Wet (Isochem North America LLC) and 2.8 parts (based on 100 part ink) of ¼" SS of Votoatim International. Polyurethane resin B is the semi-aliphatic reaction product of various diols of different molecular weight.

Example 3

Inks were prepared containing 2.4 parts of SS 20 IPA Wet nitrocellulose resin, 35 parts polyurethane, 10.6 parts of propyl acetate, 47 parts of ethanol and 5 parts of colorant (52 DT 913 pigment dispersion, CDR Pigments & Dispersions, Elizabethtown, N.J.). Polyurethanes C, D and E are polyetherpolyol-based aliphatic polyurethane resin of different softness with D being softer than C and E being harder than C; polyurethane F is a hydroxyl functional aliphatic polyurethane resin; G is an amide-urethane hybrid aliphatic polyurethane resin; and H is a nitrocellulose compatible aliphatic polyurethane resin.

Each ink was printed on a composite polyethylene/proproypylene nonwoven substrate and visually observed for color transference pursuant to the test method of Example 2. The composition and results are set forth in Table 3 below.

TABLE 3

|  | 3-A | 3-B | 3-C | 3-D | 3-E | 3-F | 3-G | 3-H |
| --- | --- | --- | --- | --- | --- | --- | --- | --- |
| Polyurethane resin | B | C | D | E | F | G | H | A |
| Rub test rating (1-10) | 7 | 6 | 5 | 5 | 6 | 1 | 6 | 8 |

Example 4

The ink of Example 1 was compared to various conventional ink formulations by testing according to the method of Example 2. Ink 4-A is a conventional flexographic printing ink used for surface printing, while 4-B is a conventional gravure printing ink for lamination printing. Inks 4-C, 4-D and 4-E are conventional flexographic printing inks for lamination printing and 4-F is a flexographic and gravure ink for surface or lamination printing.

TABLE 2

| Component | Ink 2-A | Ink 2-B | Ink 2-C | Ink 2-D | Ink 2-E | Ink 2-F | Ink 2-G | Ink 2-H | Ink 2-I | Ink 2-J | Ink 2-K |
| --- | --- | --- | --- | --- | --- | --- | --- | --- | --- | --- | --- |
| Nitrocellulose resin | 2.4 | 2.4 | 1 | 5.2 | 2.4 | 2.4 | 2.4 | 2.4 | 2.4 | 2.4 | 2.4 |
| Polyurethane resin A | 35 |  |  |  |  |  |  | 35 | 35 | 35 | 35 |
| Polyurethane resin B |  | 35 | 35 | 35 | 35 | 35 | 35 |  |  |  |  |
| Propyl acetate | 10.6 | 10.6 | 12 | 10.6 | 10.6 | 10.6 | 10.6 | 10.6 | 10.6 | 10.6 | 10.6 |
| Ethanol | 42 | 47 | 47 | 44.2 | 46 | 44 | 42 | 47 | 44.2 | 46 | 44 |
| Colorant[a] | 5 | 5 | 5 | 5 | 5 | 5 | 5 | 5 | 5 | 5 | 5 |
| Silicone[b] | 0 | 0 | 0 | 0 | 1 | 0 | 0 | 0 | 0 | 1 | 0 |
| Ti phosphate complex[c] | 0 | 0 | 0 | 0 | 0 | 3 | 0 | 0 | 0 | 0 | 3 |
| Wax[d] | 5 | 0 | 0 | 0 | 0 | 0 | 5 | 0 | 0 | 0 | 0 |
| TOTAL | 100 | 100 | 100 | 100 | 100 | 100 | 100 | 100 | 100 | 100 | 100 |
| Rub test rating (1-10) | 9 | 7 | 8 | 6 | 7 | 7 | 8 | 8 | 7 | 8 | 8 |

[a]Dispersion of B15:3 pigment and nitrocellulose, 52 DT 913 dispersion, CDR Pigments & Dispersions of Elizabethtown, NJ.
[b]DOW 51, DOW Chemical of Midland, MI.
[c]Vertec IA-10, Johnson Matthey Catalysts of Cleveland U.K.
[d]erucamide/stearamide wax blend 11-K-14, Sun Chemical Corporation of Parsippany, NJ.

TABLE 4

| Component | Example 1 Ink | Comparative Ink 4-A | 4-B | 4-C | 4-D | 4-E | 4-F |
|---|---|---|---|---|---|---|---|
| Nitrocellulose resin | 1.0 | 8.45 ($2.38^a$ + $6.07^b$) | 13.83 ($4.13^a$ + $9.7^b$) | 0 | 0 | 0 | 0 |
| polyurethane resin | 35 | $5.6^c$ | $4^d$ | $19.25^e$ | $19.25^e$ | $27^e$ | $50^f$ |
| Acrylic resin | 0 | $5.6^g$ | $2.0^h$ | 0 | $7.5^i$ | $9.0^j$ | 0 |
| Polyester resin$^k$ | 0 | 0 | 0 | 19.25 | 13.75 | 0 | 0 |
| Propyl acetate | 12 | 18.6 | 29.3 | 0 | 0 | 0 | |
| Ethanol | 47 | 40.24 | 40.32 | 5 | 1.25 | 7.29 | 0 |
| Water | 0 | 0 | 0 | 6 | 5 | 1.71 | 0 |
| Pigment | 5 | $15.75^l$ | $8.55^l$ | $50^m$ | $50^m$ | $50^m$ | $50^m$ |
| Wax | 0 | $2.0^n$ | 0 | 0 | 0 | 0 | 0 |
| Additives | 0 | $1.2^o$ + $0.4^p$ + $0.16^q$ + $2.0^r$ | 0 | 0 | $1.25^s$ + $1.25^t$ | $1.25^s$ + $1.25^t$ + $2.5^u$ | $5.0^v$ | 0 |
| TOTAL | 100 | 100 | 100 | 100 | 100 | 100 | 100 |
| Rub test rating (1-10, 10 highest) | 9 | 2 | 3 | 3 | 3 | 2 | 1 |

$^a$¼" SS nitrocellulose, Votoratim International of Curacao Netherlands Antilles.
$^b$30-35 SS nitrocellulose, Nobel Trading of Duncanville, TX.
$^c$aliphatic polyurethane resin
$^d$aliphatic polyurethane resin
$^e$aliphatic polyurethane resin
$^f$aliphatic polyurethane resin.
$^g$Phenolic resin, Beckacite 004-01, Reichhold of Durham, NC
$^h$Styrenated acrylic, Reactol 100, Lawter International of Pleasant Prairie, WI
$^i$Styrene/maleic anhydride polymer, SMA 17352G, Sartomer Co of Exton, PA
$^j$Rosin acrylic solution, TV94-5991, Sun Chemical Corporation of Parsippany, NJ
$^k$R2764-133, Lubrizol Dock Resins of Linden NJ,
$^l$Irgalite Blue GLVO
$^m$B15:3 surfactant/acrylic dispersion, BCD-9730, Sun Chemical Corporation of Parsippany, NJ.
$^n$SST-3 Teflon, Shamrock Technologies of Newark, NJ
$^o$Vertec IA-10, Johnson Matthey Catalysts of Cleveland U.K., titanate.
$^p$Bisamid waw, Printwax A70 Pulver, Deurex Micro Technology, Troglitz Germany.
$^q$Polydimethylsiloxane, DC-200 Fluid, DOW Chemical of Midland, MI., silicone.
$^r$Hydrogenated rosin ester, Hercolyn D, Chemcentral of Bedford, IL, plasticizer.
$^s$Polyglycol ester silica blend, Nalco 2303, Nalco Chemical of Naperville, IL, defoamer.
$^t$Paraffinic blend, Dapro DF-975, Elementis Specialites of Hightstown, NJ, defoamer.
$^u$Sorbitol solution, Univar of Kirkland, WA, defoamer.
$^v$Clay, ASP 600', A. E. Fleming of Warren, MI, clay.

Example 5

A printing ink was prepared according to the following formula:

TABLE 5

| Component | Weight percent |
|---|---|
| Polyurethane resin A | 55.0 |
| Propyl acetate | 12.0 |
| Ethanol | 25.0 |
| Pigment (Irgalite Blue GLVO) | 8.0 |
| TOTAL | 100.0 |

Example 6

Printing inks are prepared according to the following formulae:

TABLE 6

| Component | Weight percent | | |
|---|---|---|---|
| Polyurethane resin B | 57.0 | 53.0 | 46.0 |
| Butyl acetate | 42.0 | 12.0 | |
| Diethylene glycol monobutyl ether | | 27.0 | 45.0 |
| Pigment White #6 | 5.0 | 8.0 | 9.0 |
| TOTAL | 100.0 | 100.0 | 100.0 |

Example 7

Ink compositions were prepared in accordance with the formulations of Examples 1 and 5 with polyurethanes of different molecular weights and tested for rub resistance. The polyurethanes, molecular weights and rub results are set forth in Table 7.

TABLE 7

| Polyurethane | Molecular Weight | Ex. 1 Formula Rub Rating | Ex. 1 Formula Rub Rating |
|---|---|---|---|
| I | 6,952 | 2 | 2 |
| J | 35,137 | 6 | 8 |

TABLE 7-continued

| Polyurethane | Molecular Weight | Ex. 1 Formula Rub Rating | Ex. 1 Formula Rub Rating |
|---|---|---|---|
| K | 23,449 | 7 | 7 |
| L | 59,743 | 8 | 9 |
| A | 81,479 | 8 | 9 |

Polyurethane I is the reaction product of MDI and PPG;
J is the reaction product of mixture of TDI and IPDI with PPG;
K is the reaction product of IPDI and PPG; and
L is the reaction product of a mixture of MDI and IPDI with PPG.

The invention has been described in terms of preferred embodiments thereof, but is more broadly applicable as will be understood by those skilled in the art. The scope of the invention is only limited by the following claims.

What is claimed is:

1. A printing ink comprising:
   a. polyurethane resin having a rub rating of at least 6;
   b. organic solvent; and
   c. colorant,
   wherein the rub rating is the average of 10 evaluations on a scale of 1 to 10, with 10 being the best, using a Sutherland Rub tester to transfer ink from ink printed on a composite polyethylene/polypropylene nonwoven substrate to a white linen swatch.

2. The printing ink of claim 1 wherein the polyurethane resin is the reaction product of a mixture of at least one aliphatic diisocyanate and at least one aromatic diisocyanate with at least one isocyanate-reactive compound.

3. The printing ink of claim 1 wherein the polyurethane resin has a molecular weight of at least 10,000.

4. The printing ink of claim 1 further comprising an amount of nitrocellulose resin which does not exceed 15 wt. %.

5. The printing ink of claim 1 further comprising nitrocellulose resin of solubility grade SS in an amount about 1 wt. % and about 10 wt. %; and wherein the solvent is an ester, an alcohol or a combination thereof and is present in an amount of about 1 wt. % and about 70 wt. %.

6. The printing ink of claim 5 wherein the nitrocellulose resin is present in an amount about 0.1 wt. % and about 4 wt. %, and wherein the polyurethane resin has a molecular weight of at least 20,000 and is present in an amount of about 30 wt. % and about 40 wt. %; and the solvent is a combination of ester and alcohol in a total amount of about 10 wt. % to 40 wt. %.

7. The printing ink of claim 6 wherein the colorant is selected from the group consisting of organic and inorganic pigments and is present in an amount of between 0.1 wt. % and about 20 wt. %; the polyurethane resin is a semi-aliphatic resin having a molecular weight of at least about 23,000; and the ink further comprises wax in an amount up to about 4 wt. %.

8. The printing ink of claim 7 wherein the colorant is present in an amount of between 0.1 wt. % and about 1 wt. %; and the wax is present in an amount of about 0.1 wt. % to 2 wt. %.

9. The printing ink of claim 1 wherein the polyurethane resin is present in an amount of about 10 wt. % and about 60 wt. %, the solvent is present in an amount of about 1 wt. % and about 70 wt. %, and the colorant is present in an amount of about 0.1 wt. % and about 20 wt. %.

10. The printing ink of claim 9 wherein the solvent is an ester, an alcohol or a combination thereof.

11. The printing ink of claim 10, wherein the ester solvent is selected from the group consisting of propyl acetate, ethyl acetate, butyl acetate, isopropyl acetate, propylene glycol monomethyl ether acetate, and combinations thereof; and the alcohol solvent is selected from the group consisting of ethanol, propanol, isopropanol, 1-ethocy-2-propanol, propylene glycol n-propyl ether, dipropylene glycol, n-butyl ether, diacetone alcohol, methyl amyl alcohol, and combinations thereof.

12. The printing ink of claim 11 wherein the ester solvent is present in an amount of about 10 wt. % and about 40 wt. % and the alcohol solvent is present in an amount of between 10 wt. % and about 70 wt. %.

13. The printing ink of claim 12 wherein the ester solvent comprises propyl acetate, ethanol or a combination thereof.

14. The printing ink of claim 13 wherein the alcohol solvent is present in an amount of between 20 wt. % and about 60 wt. %, the polyurethane resin has a molecular weight of at least about 23,000 and is present in an amount of about 30 wt. % and about 40 wt. %, and the colorant is present in an amount of between 0.1 wt. % and about 10 wt. %.

15. The printing ink of claim 14 wherein the colorant is a pigment is selected from the group consisting of Pigment Yellow 12, Pigment Yellow 13, Pigment Yellow 14, Pigment Yellow 17, Pigment Yellow 74, Pigment Yellow 83, Pigment Red 2, Pigment Red 22, Pigment Red 23, Pigment Red 48:1, Pigment Red 48:2, Pigment Red 52, Pigment Red 53, Pigment Red 57:1, Pigment Red 122, Pigment Red 166, Pigment Red 170, Pigment Red 266, Pigment Orange 5, Pigment Orange 16, Pigment Orange 34, Pigment Orange 36, Pigment Blue 15:3, Pigment Blue 15:4, Pigment Violet 3, Pigment Violet 27, Pigment Green 7, iron oxides, Pigment White 6, Pigment White 7, and Pigment Black 7, and combinations thereof.

16. The printing ink of claim 9 further comprising a wax selected from the group consisting of amide wax, erucamide wax, polypropylene wax, paraffin wax, polyethylene wax, polyethylene terephthalate, carnauba wax and combinations thereof in an amount of 4 wt. % or less.

17. The printing ink of claim 16 wherein the wax is present in an amount of about 0.1 wt. % to about 2 wt. %.

18. In a method of flexographic printing in which an ink is applied to a substrate, the improvement which comprises employing the ink of claim 1 as said ink.

19. In a method of flexographic printing in which an ink is applied to a substrate, the improvement which comprises employing the ink of claim 2 as said ink.

20. In a method of flexographic printing in which an ink is applied to a substrate, the improvement which comprises employing the ink of claim 3 as said ink.

21. In a method of flexographic printing in which an ink is applied to a substrate, the improvement which comprises employing the ink of claim 7 as said ink.

22. In a method of rotogravure printing in which an ink is applied to a substrate, the improvement which comprises employing the ink of claim 1 as said ink.

23. In a method of rotogravure printing in which an ink is applied to a substrate, the improvement which comprises employing the ink of claim 2 as said ink.

24. In a method of flexographic printing in which an ink is applied to a substrate, the improvement which comprises employing the ink of claim 3 as said ink.

25. In a method of rotogravure printing in which an ink is applied to a substrate, the improvement which comprises employing the ink of claim 7 as said ink.

26. A nonwoven substrate printed with the printing ink of claim 1.

27. A nonwoven substrate printed with the printing ink of claim 2.

28. A nonwoven substrate printed with the printing ink of claim 3.

29. A nonwoven substrate printed with the printing ink of claim 7.

30. The nonwoven substrate of claim 27 in which the substrate is selected from the group consisting of polyethylene, polypropylene, polyester, nylon and combinations thereof.

* * * * *